US012759477B1

(12) United States Patent
Embury

(10) Patent No.: US 12,759,477 B1
(45) Date of Patent: Oct. 13, 2026

(54) DISPOSABLE VEHICLE CARGO LINER WITH FOLDING SIDEWALLS

(71) Applicant: Modern Brands Corporation, Inc., Las Vegas, NV (US)

(72) Inventor: Melissa Ann Embury, Palm Springs, CA (US)

(73) Assignee: Modern Brands Corporation Inc., Las Vegas, NV (US)

( * ) Notice: Subject to any disclaimer, the term of this patent is extended or adjusted under 35 U.S.C. 154(b) by 0 days.

(21) Appl. No.: 19/290,884

(22) Filed: Aug. 5, 2025

(51) Int. Cl.
*B60R 13/01* (2006.01)

(52) U.S. Cl.
CPC ....... *B60R 13/011* (2013.01); *B60R 2013/016* (2013.01)

(58) Field of Classification Search
None
See application file for complete search history.

(56) References Cited

U.S. PATENT DOCUMENTS 3,654,059 A 4/1972 Zisblatt
3,856,610 A * 12/1974 Bruneel ................. B60N 3/044 428/138
4,186,845 A * 2/1980 Podd .................... B65D 90/046 428/126
4,644,592 A * 2/1987 Small ..................... A47K 3/002 428/40.1
4,789,574 A * 12/1988 Selvey .................... B60R 13/01 428/56
4,876,135 A * 10/1989 McIntosh .............. A47L 23/266 428/128
4,877,281 A 10/1989 Altmann
4,890,874 A * 1/1990 Davis ...................... B60R 13/01 296/39.2
4,986,590 A * 1/1991 Patti ........................ B60R 13/01 220/23.9
5,110,171 A 5/1992 Anthony
5,128,189 A * 7/1992 Bartlett ..................... B32B 5/18 428/81
5,570,921 A * 11/1996 Brooker .................... B60R 7/02 296/39.1
6,541,089 B1 * 4/2003 Hamerski .................. C09J 7/20 428/40.1
7,597,373 B2 10/2009 McAuliffe, Jr.
8,348,324 B2 1/2013 Worden
8,852,717 B2 * 10/2014 Davis ........................ B32B 7/05 119/169

(Continued)

FOREIGN PATENT DOCUMENTS

WO 9504671 2/1995

*Primary Examiner* — Joseph D. Pape
(74) *Attorney, Agent, or Firm* — Bold IP PLLC; Christopher Mayle

(57) ABSTRACT

A disposable vehicle cargo liner having a base panel having a top surface and a bottom surface; a plurality of sidewalls integrally formed with and extending from a perimeter of the base panel, the sidewalls being foldable between a folded position and an erected position; wherein the base panel and the sidewalls are constructed from a composite material having liquid-absorbent properties on the top surface and water-resistant properties on the bottom surface; and a plurality of adhesive strips positioned on exterior surfaces of the sidewalls for removably securing the liner to interior walls of a vehicle cargo area.

14 Claims, 4 Drawing Sheets

(56) References Cited

U.S. PATENT DOCUMENTS

| | | | |
|---|---|---|---|
| 9,320,258 | B2 | 4/2016 | Haddad |
| 10,227,051 | B2 | 3/2019 | Koskey |
| 10,342,360 | B2 | 7/2019 | Calhoun et al. |
| 10,343,568 | B2 | 7/2019 | Umlauf |
| 11,827,159 | B2 | 11/2023 | Stevens |
| 2008/0303303 | A1 | 12/2008 | Valentine |
| 2009/0033121 | A1 | 2/2009 | McGorman |
| 2016/0107552 | A1 | 4/2016 | Wakeman |

* cited by examiner

DISPOSABLE VEHICLE CARGO LINER WITH FOLDING SIDEWALLS

FIELD OF DISCLOSURE

The overall invention relates to protective liners for vehicle cargo areas, and more particularly to disposable cargo liners with integrated sidewalls and adhesive positioning systems for protecting vehicle cargo spaces from liquids and debris.

BACKGROUND

Vehicle cargo areas, particularly SUV cargo spaces, are frequently exposed to materials that can cause permanent staining, odors, or damage from pets. Traditional solutions include permanent bed liners, removable rubber mats, and fabric liners, each with significant drawbacks. Non-disposable fabric liners are typically absorbent and retain moisture, requiring removal and manual cleaning after each use. Once cleaned, these liners are extremely difficult to reinstall properly, often requiring multiple attempts and significant effort. The retained moisture can lead to mold, mildew, and persistent odors. Thermoplastic elastomer and similar synthetic liners do not absorb moisture but are difficult to clean thoroughly, particularly for substances like paint, chemicals, or organic materials. These liners also typically lack adequate sidewall protection, allowing liquids to seep between the liner and cargo area walls. Existing disposable solutions are typically flat sheets without integrated sidewall protection or secure positioning systems, leading to shifting during transport and inadequate protection of vertical surfaces. Thus exists a need for a disposable cargo liner that provides comprehensive protection, easy installation, secure positioning, and complete disposability without leaving residue or requiring cleaning.

SUMMARY

The present invention provides a disposable vehicle cargo liner for pet waste or miscellaneous spills, grease and grime having a base panel and integrated folding sidewalls constructed from a cotton-polymer composite material. The liner features liquid absorption on the top surface and water resistance on the bottom surface, preventing fluid penetration to the vehicle cargo area. The liner includes strategically positioned non-residue adhesive strips for secure installation to the interior of the vehicle and a folding system that allows the sidewalls to be easily erected to form a protective barrier around the specific cargo area. The sidewalls may extend approximately 4 inches above the base and are designed to adhere to the interior walls of various cargo space configurations. The invention is manufactured in multiple sizes to accommodate different vehicle cargo areas and is designed for single-use disposal, eliminating the need for cleaning and storage while providing superior protection compared to existing solutions.

In some aspects, the techniques described herein relate to a disposable vehicle cargo liner including: a base panel having a top surface and a bottom surface; a plurality of sidewalls integrally formed with and extending from a perimeter of the base panel, the plurality of sidewalls being foldable between a folded position and an erected position; wherein the base panel and the plurality of sidewalls are constructed from a composite material having liquid-absorbent properties on the top surface and water-resistant properties on the bottom surface; and a plurality of adhesive strips positioned on exterior surfaces of the plurality of sidewalls for removably securing the disposable vehicle cargo liner to interior walls of a vehicle cargo area.

In some aspects, the techniques described herein relate to a disposable vehicle cargo liner, wherein the composite material includes a cotton-polymer composite having cotton fibers on the top surface and a polymer coating on the bottom surface.

In some aspects, the techniques described herein relate to a disposable vehicle cargo liner, wherein the plurality of sidewalls includes: a top flap extending from an upper edge of the base panel; and two side flaps extending from left and right edges of the base panel.

In some aspects, the techniques described herein relate to a disposable vehicle cargo liner, wherein the plurality of sidewalls further include side flaps extending from each end of the top flap, the side flaps being foldable to overlap the top flap in the folded position.

In some aspects, the techniques described herein relate to a disposable vehicle cargo liner, wherein the side flaps have a length extending beyond dimensions of the base panel to allow formation of a partial or complete fourth sidewall or to be folded back into the side flaps.

In some aspects, the techniques described herein relate to a disposable vehicle cargo liner, wherein the plurality of sidewalls form vertical barriers of approximately 4 inches in height when in the erected position.

In some aspects, the techniques described herein relate to a disposable vehicle cargo liner, wherein the plurality of adhesive strips include a non-residue, medium-tack adhesive formulation.

In some aspects, the techniques described herein relate to a disposable vehicle cargo liner, further including removable release liners covering each of the adhesive strips, the removable release liners having pull tabs for facilitating removal.

In some aspects, the techniques described herein relate to a disposable vehicle cargo liner, wherein the disposable vehicle cargo liner is manufactured in a pre-folded configuration for compact storage and shipping.

In some aspects, the techniques described herein relate to a disposable vehicle cargo liner, further including alignment marks on the base panel for positioning the liner within the vehicle cargo area.

In some aspects, the techniques described herein relate to a disposable containment system for vehicle cargo areas including: a unified sheet of cotton-polymer composite material formed into a base panel with integral folding sidewalls; the composite material having an absorbent cotton upper surface and a waterproof polymer lower surface; adhesive attachment means on the sidewalls for securing to vehicle interior surfaces; and wherein the system is configured for single-use disposal.

In some aspects, the techniques described herein relate to a disposable containment system, wherein the sidewalls are configurable to create a continuous barrier around a perimeter of the base panel when erected.

In some aspects, the techniques described herein relate to a method of protecting a vehicle cargo area including: providing a disposable liner having a base panel with integral folding sidewalls, the liner constructed from material having liquid-absorbent top surface and water-resistant bottom surface; placing the disposable liner in a folded configuration into the vehicle cargo area; unfolding the disposable liner to match dimensions of the vehicle cargo area; erecting the sidewalls from a folded position to an upright position; removing release liners from adhesive strips on the sidewalls; and securing the erected sidewalls to interior walls of the vehicle cargo area using the adhesive strips.

In some aspects, the techniques described herein relate to a method, further including folding side flaps extending from a top flap either inward to eliminate excess length or outward to form a fourth sidewall barrier.

In some aspects, the techniques described herein relate to a method, further including after use, removing the disposable liner as a single unit containing absorbed materials for disposal.

In some aspects, the techniques described herein relate to a disposable vehicle cargo liner including a base panel and three integrated sidewalls extending from the base panel, wherein the three integrated sidewalls include an upper sidewall and two lateral sidewalls.

In some aspects, the techniques described herein relate to a disposable vehicle cargo liner, further including adhesive strips having properties that allow removal without leaving residue on vehicle surfaces.

In some aspects, the techniques described herein relate to a disposable vehicle cargo liner, wherein the disposable vehicle cargo liner includes a composite structure providing liquid containment through absorption on one surface and prevention of liquid penetration on an opposite surface.

In some aspects, the techniques described herein relate to a disposable vehicle cargo liner, wherein the three integrated sidewalls are configured to fold flat against the base panel for storage and to extend upward to form protective barriers when deployed.

In some aspects, the techniques described herein relate to a disposable vehicle cargo liner, wherein the two lateral sidewalls are longer than the base panel.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
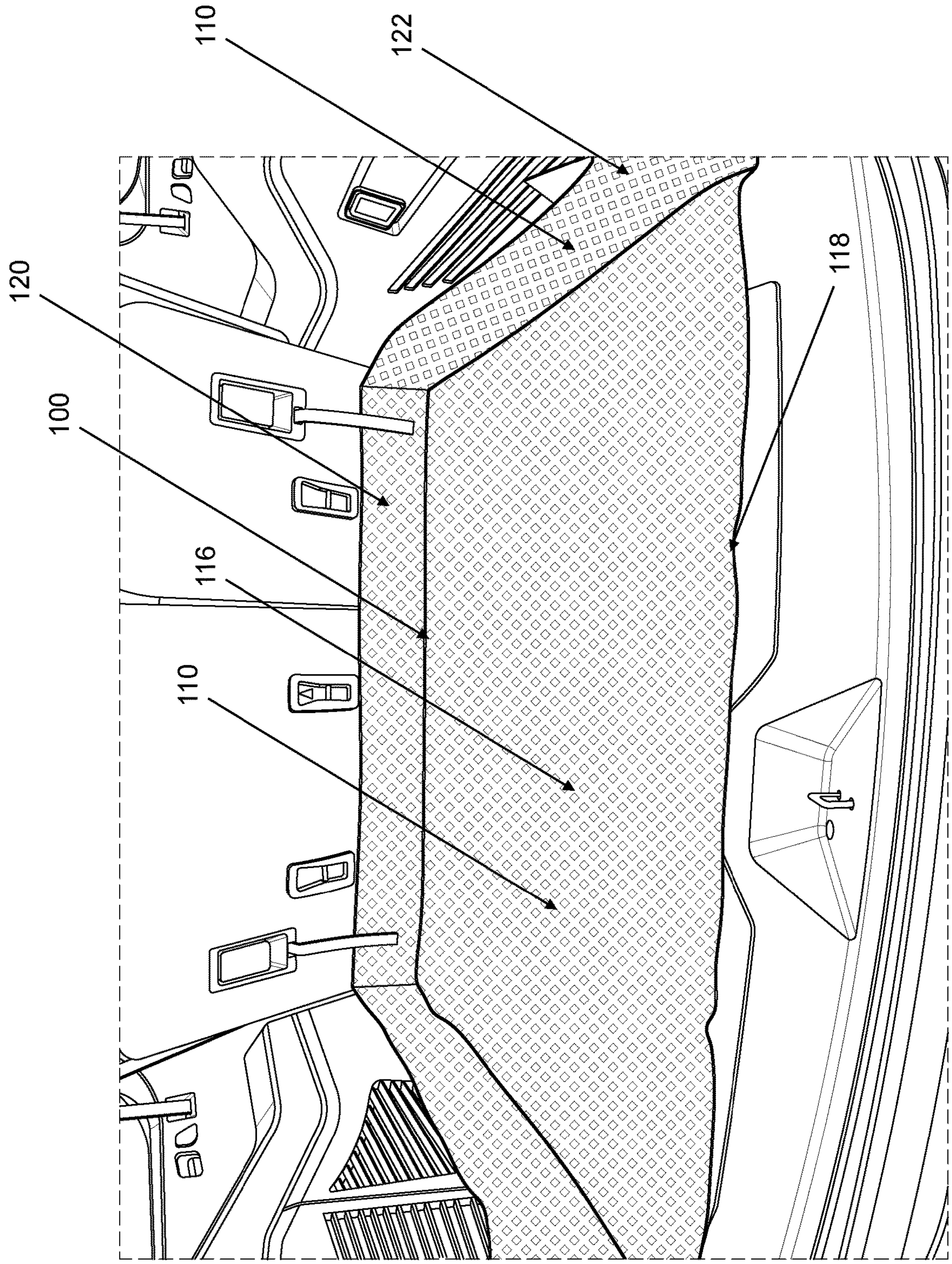
FIG. 1 is showing the active position

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment and, such references mean at least one of the embodiments.

Reference in this specification to “one embodiment” or “an embodiment” means that a particular feature, structure, or characteristic described in connection with the embodiment is included in at least one embodiment of the disclosure. Appearances of the phrase “in one embodiment” in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be described in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

The present invention is directed to a disposable liner for a vehicle cargo area. The liner has a water absorbent upper surface and a water-proof lower surface. Non-resin, peel and stick adhesive elements may be located along foldable sidewalls to secure it to the vehicle interior.

With reference to FIG. 1, one embodiment of a disposable vehicle cargo liner 100 is illustrated. Disposable vehicle cargo liner 100 includes a base panel 110 that extends upward and outward into three integrated sidewalls 114 including one in an upper area of base panel 110 and two on the left and right areas of base panel 110. Sidewalls 114 and base panel 110 may be formed from a unified piece of cotton-polymer composite material. Base panel 110 may be dimensioned to fit various standard vehicle cargo areas and is available in multiple sizes depending on the need and circumstances of the user.

Disposable vehicle cargo liner 100 may be constructed from a cotton-polymer composite material providing liquid absorption on a top surface 116 through cotton fibers and water resistance on a bottom surface 118 through polymer coating. The liner may a continuous single piece or flaps/sidewalls may be integrated to the base panel. Sidewalls 114 may be integrally formed with the base panel 110 and extend outward from the base perimeter. As discussed, sidewalls 114 may include a top flap 120 which is a horizontal elongated rectangular portion that unfolds upward from the base panel edge to form a component of the wall structure against the cargo area. Top flap 120 may be of a length that is less than the length of base panel 110 to accommodate for side flaps 122.

Sidewalls 114 may include side flaps 122 that are portions extending from each end of top flap 120 that fold downward to overlap top flap 120 in a folded position and upward to form the wall structure when erected. In some non-limiting embodiments, side flaps 122 may be of a length that extends beyond base panel 110 dimensions to allow folding back against the cargo area walls for secure positioning or folding outward towards each other to form a complete or partial fourth sidewall which would be positioned against a lower portion of the cargo area (opposite of the top flap 120) such as against the door of the trunk, as illustrated in FIG. 1.

Figure 2:
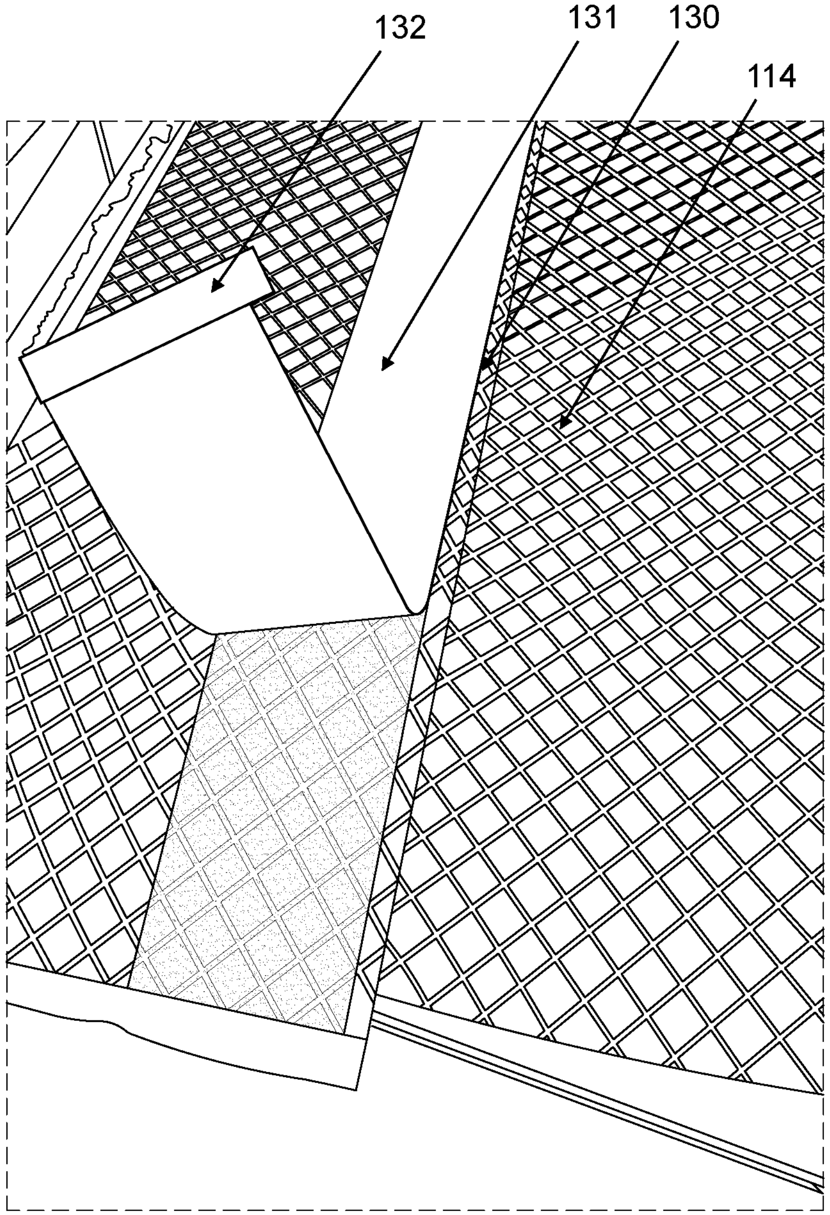
FIG. 2 is showing a close-up of the tape strip

Sidewalls 114 are designed to create approximately 4-inch vertical barriers when erected, providing comprehensive protection for the cargo area perimeter. However this is non-limiting and may be of any height depending on the vehicle and circumstances needed. Disposable vehicle cargo liner 100 may include strategically positioned adhesive strips 130 on outside surfaces of sidewalls 114 having a non-residue, medium-tack adhesive formulation to removably attach to the inner walls of a cargo area of the vehicle, as illustrated in FIG. 2. When erected, adhesive strips 130 face away towards the inner walls of a cargo area of the vehicle while when in a folded configuration adhesive strips 130 face upward away from base panel 110.

Figure 3:
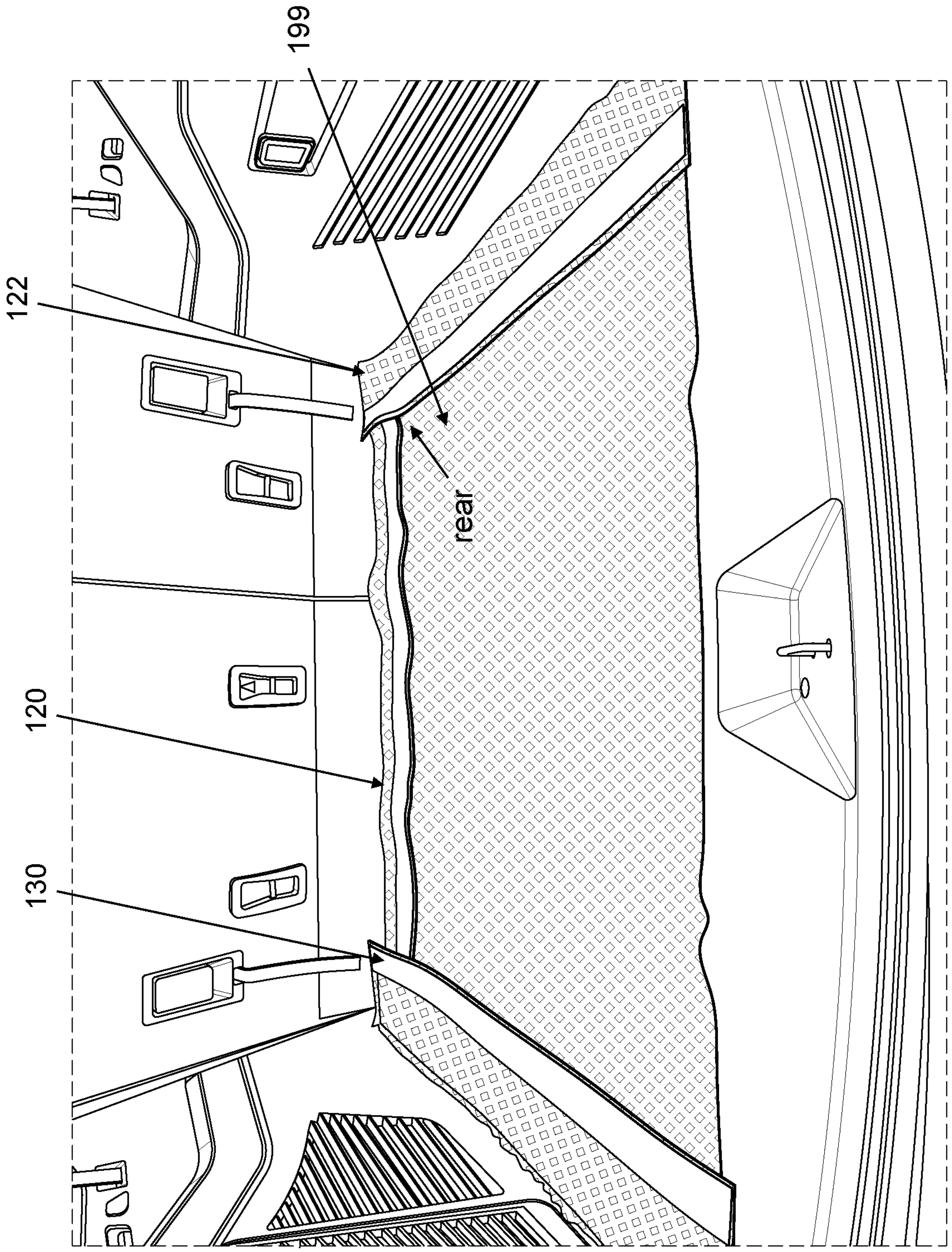
FIG. 3 is showing the sidewalls folded down
Figure 4:
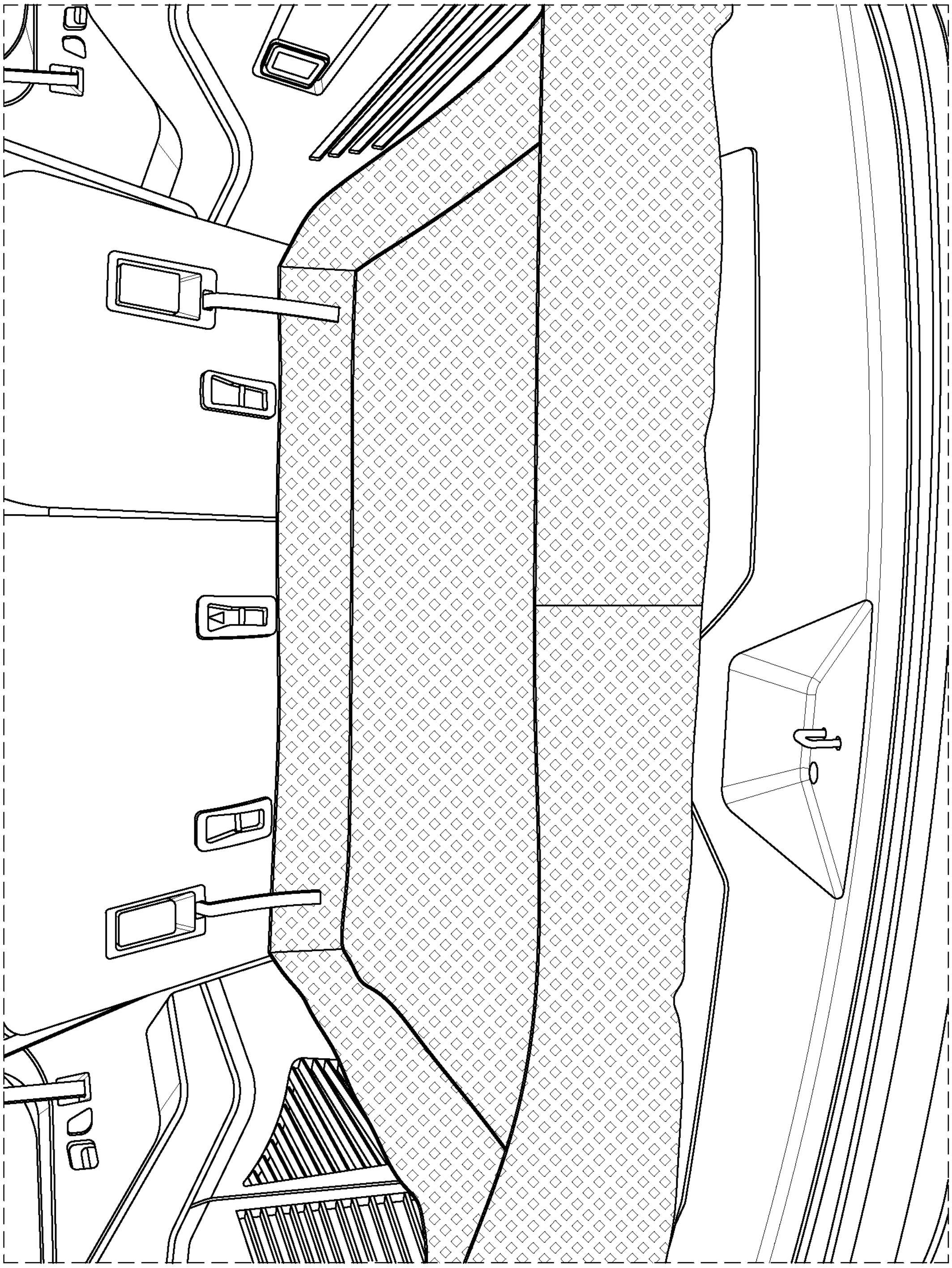
FIG. 4 is showing the active position zoomed out

Each adhesive strip 130 may be covered by a removable release liner 131 having a thin, flexible release paper or film that protects the adhesive surface during storage and shipping. Each adhesive strip 130 may have one or more pull tabs 132 that are extended portions of the release liner that extend beyond the adhesive strip edges, allowing easy gripping and removal. One or more perforations or score lines may also be used that allow the release liner to be removed in sections Disposable vehicle cargo liner 100 may be manufactured in a pre-folded configuration allowing simple installation: The folded liner may be placed in the cargo area with alignment marks 199 corresponding to the corners, as illustrated in FIG. 3. The liner may then be unfolded to match the cargo area dimensions when properly positioned. Side flaps 122 may be folded outward against the cargo area and then folded inward to eliminate any length that extends beyond the cargo area. Top flap 120 may be folded upward against the cargo area, as illustrated in FIG. 4. The user may then remove the removable liner of the adhesive strips 130 and apply the adhesive side to the interior of the cargo area.

During use, the cotton top surface 116 absorbs spills while polymer bottom surface 118 prevents penetration to the vehicle cargo area. When installed, erected sidewalls 114 create a barrier preventing liquids from flowing between the liner and cargo area walls while adhesive strips 130 maintain liner position during vehicle movement and cargo loading/unloading. Disposable vehicle cargo liner 100 may then be removed as a single unit for disposal, containing all absorbed materials.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A disposable vehicle cargo liner comprising: a base panel having a top surface and a bottom surface; a plurality of sidewalls integrally formed with and extending from a perimeter of the base panel, the plurality of sidewalls being foldable between a folded position and an erected position; wherein the base panel and the plurality of sidewalls are constructed from a composite material having liquid-absorbent properties on the top surface and water-resistant properties on the bottom surface; and a plurality of adhesive strips positioned only on exterior surfaces of the plurality of sidewalls for removably securing the disposable vehicle cargo liner to interior walls of a vehicle cargo area, wherein the plurality of sidewalls comprise a top flap having an elongated rectangular portion and extending from an upper edge of the base panel and two side flaps extending from side edges of the base panel, wherein the side flaps extending from each end of the top flap, the side flaps being foldable to overlap the top flap in the folded position, wherein the disposable vehicle cargo liner is formed from a single continuous sheet of composite material without seams joining separate panel components, and wherein the disposable vehicle cargo liner does not require corresponding permanent fastener hardware to be pre-installed on interior surfaces of the vehicle cargo area for securing the liner thereto.

2. The disposable vehicle cargo liner of claim 1, wherein the composite material comprises a cotton-polymer composite having cotton fibers on the top surface and a polymer coating on the bottom surface.

3. The disposable vehicle cargo liner of claim 1, wherein the side flaps have a length extending rearward, when positioned, past the base panel creating a fourth sidewall positioned against a rearward portion of the vehicle cargo area opposite of the top flap.

4. The disposable vehicle cargo liner of claim 3, wherein the rearward portion of the vehicle cargo area comprises a rear door.

5. The disposable vehicle cargo liner of claim 1, wherein the plurality of adhesive strips comprise a non-residue, medium-tack adhesive formulation.

6. The disposable vehicle cargo liner of claim 1, further comprising removable release liners covering each of the adhesive strips, the removable release liners having pull tabs for facilitating removal.

7. The disposable vehicle cargo liner of claim 1, wherein the disposable vehicle cargo liner is manufactured in a pre-folded configuration for compact storage and shipping.

8. The disposable vehicle cargo liner of claim 1, further comprising alignment marks on the base panel for positioning the liner within the vehicle cargo area.

9. A disposable containment system for vehicle cargo areas comprising: a single continuous sheet of cotton-polymer composite material formed into a base panel with integral folding sidewalls; the composite material having an absorbent cotton upper surface and a waterproof polymer lower surface; adhesive attachment on the sidewalls and not the base panel for securing to vehicle interior surfaces, wherein the sidewalls include two side flaps and a top flap, wherein the side flaps extend from each end of the top flap and are foldable to overlap the top flap in a folded position, and wherein the two side flaps have a length extending rearward beyond a rearward edge of the base panel and are configured to be folded outward then back inward to eliminate excess length extending beyond a rearward edge of the vehicle cargo area; and wherein the system is configured for single-use disposal.

10. The disposable containment system of claim 9, wherein the sidewalls are configurable to create a continuous barrier around a perimeter of the base panel when erected.

11. A disposable vehicle cargo liner, wherein the disposable vehicle cargo liner is formed from a single continuous sheet, wherein the disposable vehicle cargo liner comprising a base panel and three integrated sidewalls extending from the base panel, wherein the three integrated sidewalls comprising: a forward sidewall extending along a forward edge of the base panel, a first lateral sidewall extending along a first lateral edge of the base panel, and a second lateral sidewall extending along a second lateral edge of the base panel, wherein when the forward sidewall is folded, the first and second lateral sidewalls overlap the forward sidewall and do not extend above an upper edge of the forward sidewall, wherein the first and second lateral sidewalls each extend rearward beyond a rearward edge of the base panel, wherein the first and second lateral sidewalls connect directly to one another without an intermediate panel bridging between the first and second lateral sidewalls, thereby forming a complete lateral sidewall.

12. The disposable vehicle cargo liner of claim 11, further comprising adhesive strips having properties that allow removal without leaving residue on vehicle surfaces.

13. The disposable vehicle cargo liner of claim 11, wherein the disposable vehicle cargo liner comprises a composite structure providing liquid containment through absorption on one surface and prevention of liquid penetration on an opposite surface.

14. The disposable vehicle cargo liner of claim 11, wherein the first and second lateral sidewalls each extend rearward beyond the rearward edge of the base panel and are configured to be folded rearward to eliminate excess length extending beyond a rearward edge of the vehicle cargo area.

* * * * *